No. 898,079. PATENTED SEPT. 8, 1908.
R. N. WILLIAMS, Jr.
CLAY EXCAVATOR.
APPLICATION FILED DEC. 30, 1907.

6 SHEETS—SHEET 1.

Witnesses
J. Ellis Glen
J. Earl Ryan

Inventor
Robert Neil Williams Jr.
by Arba B. Marvin
Atty.

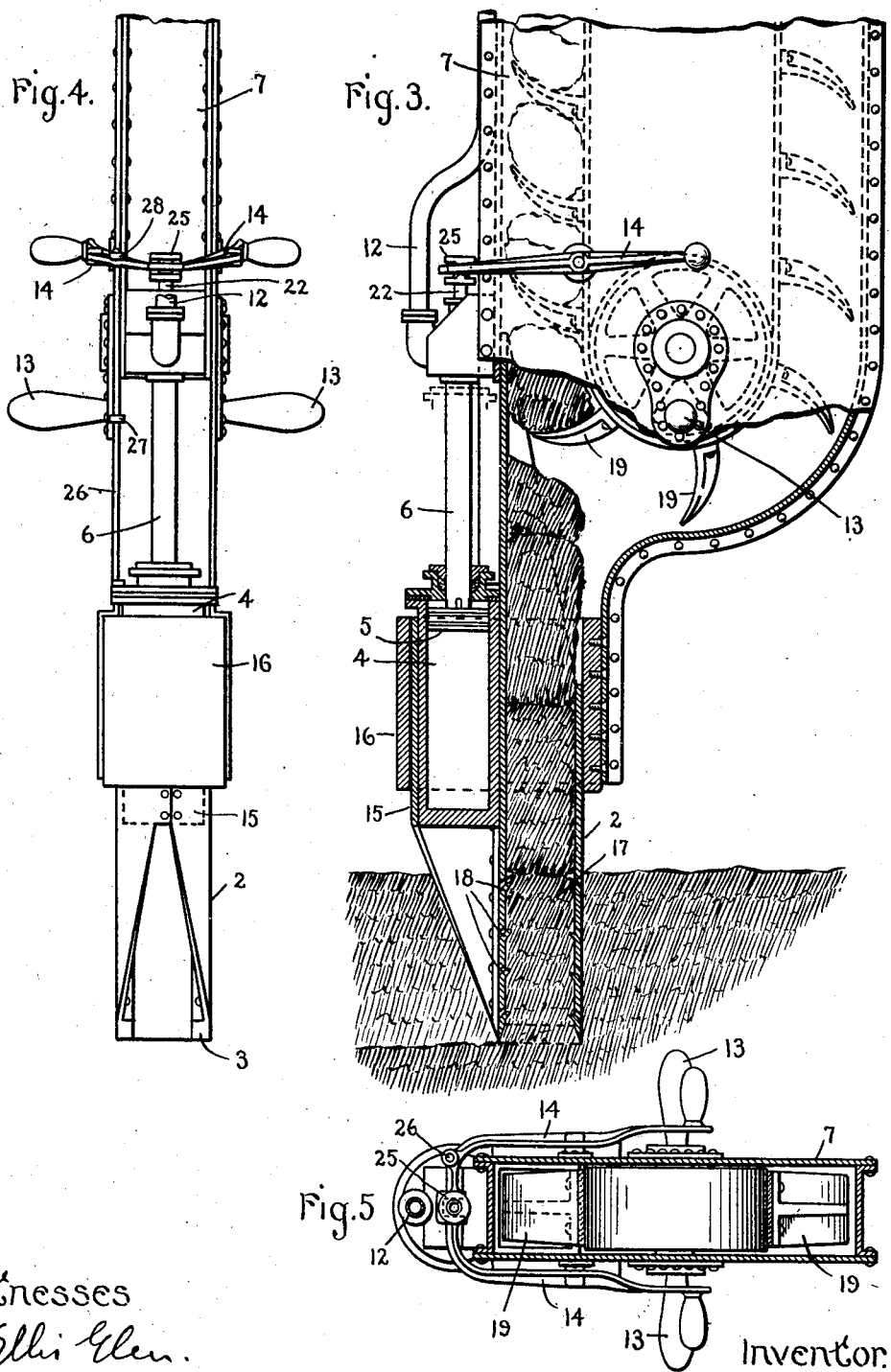

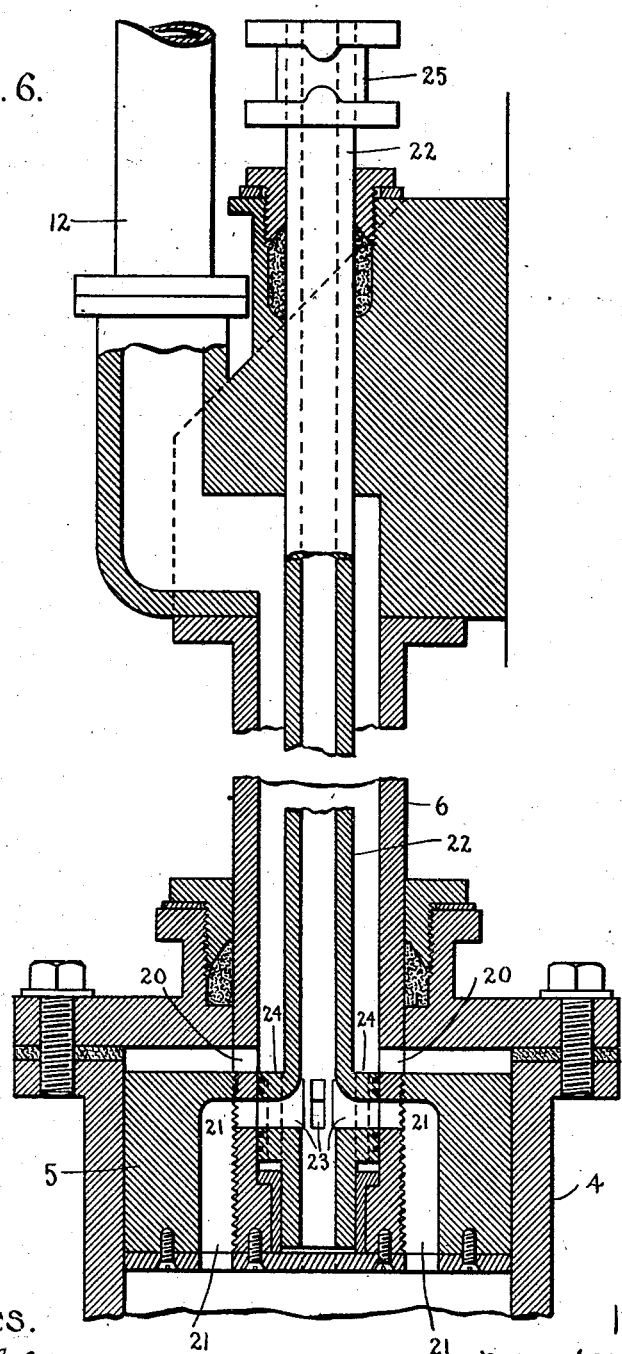

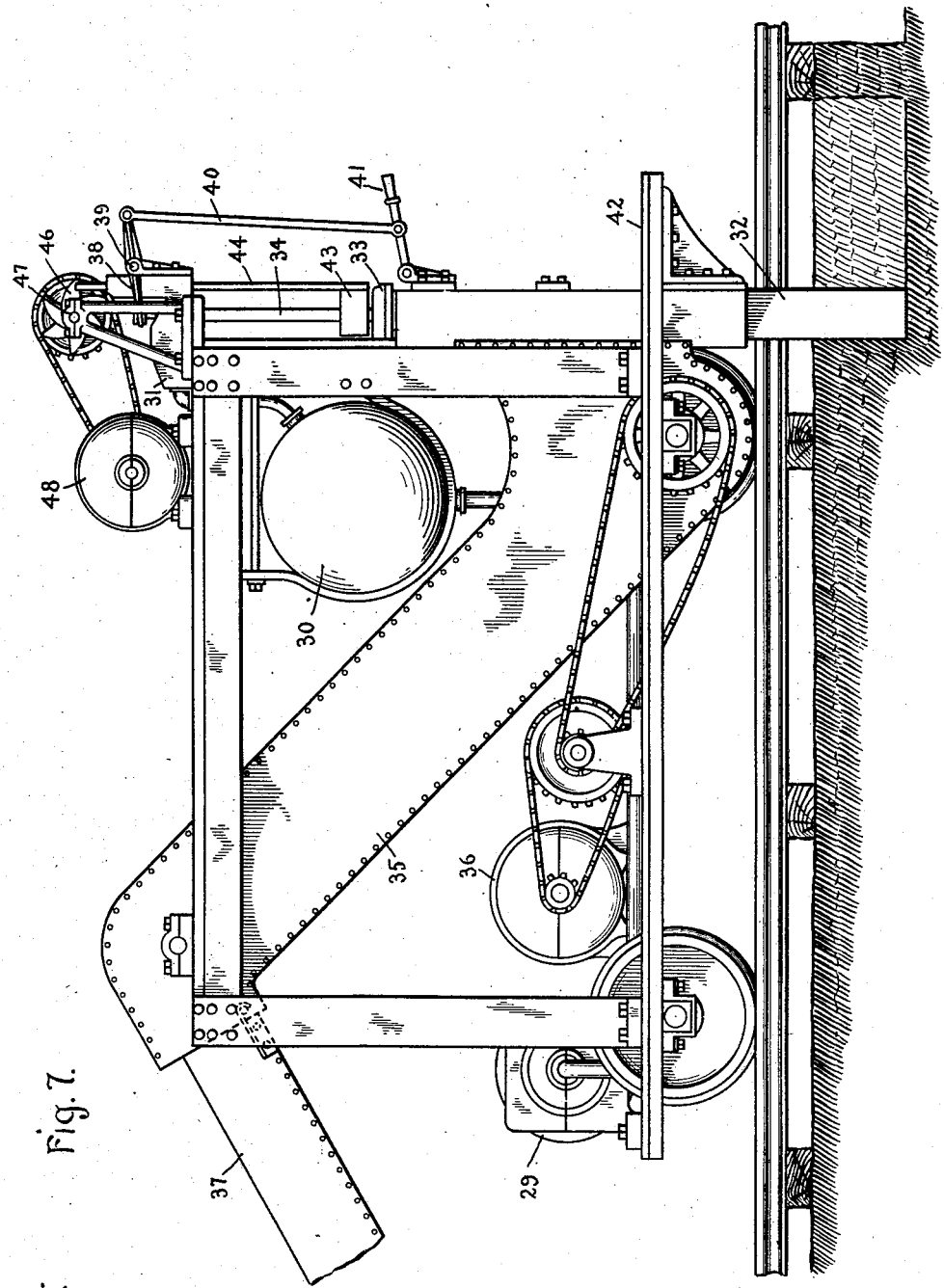

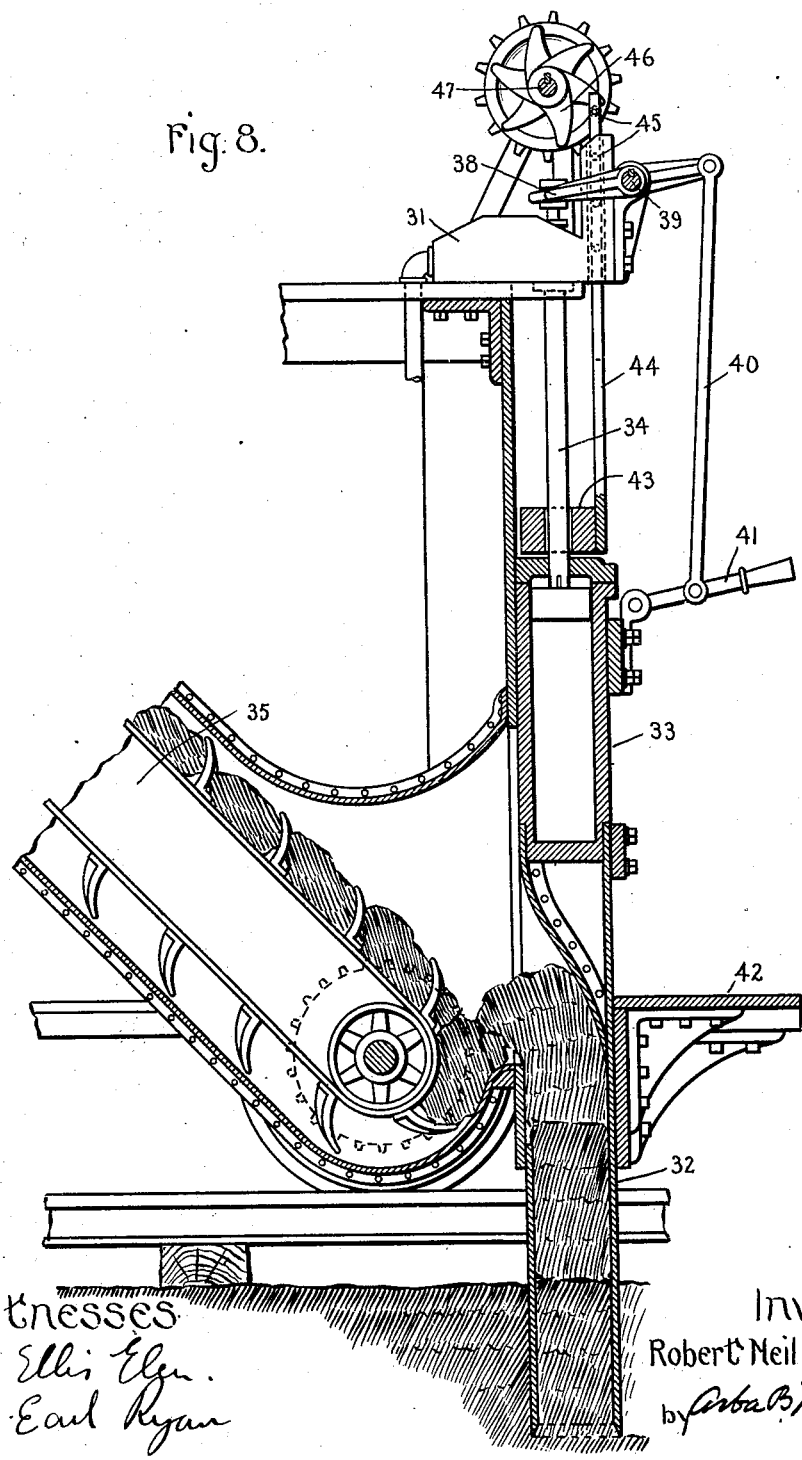

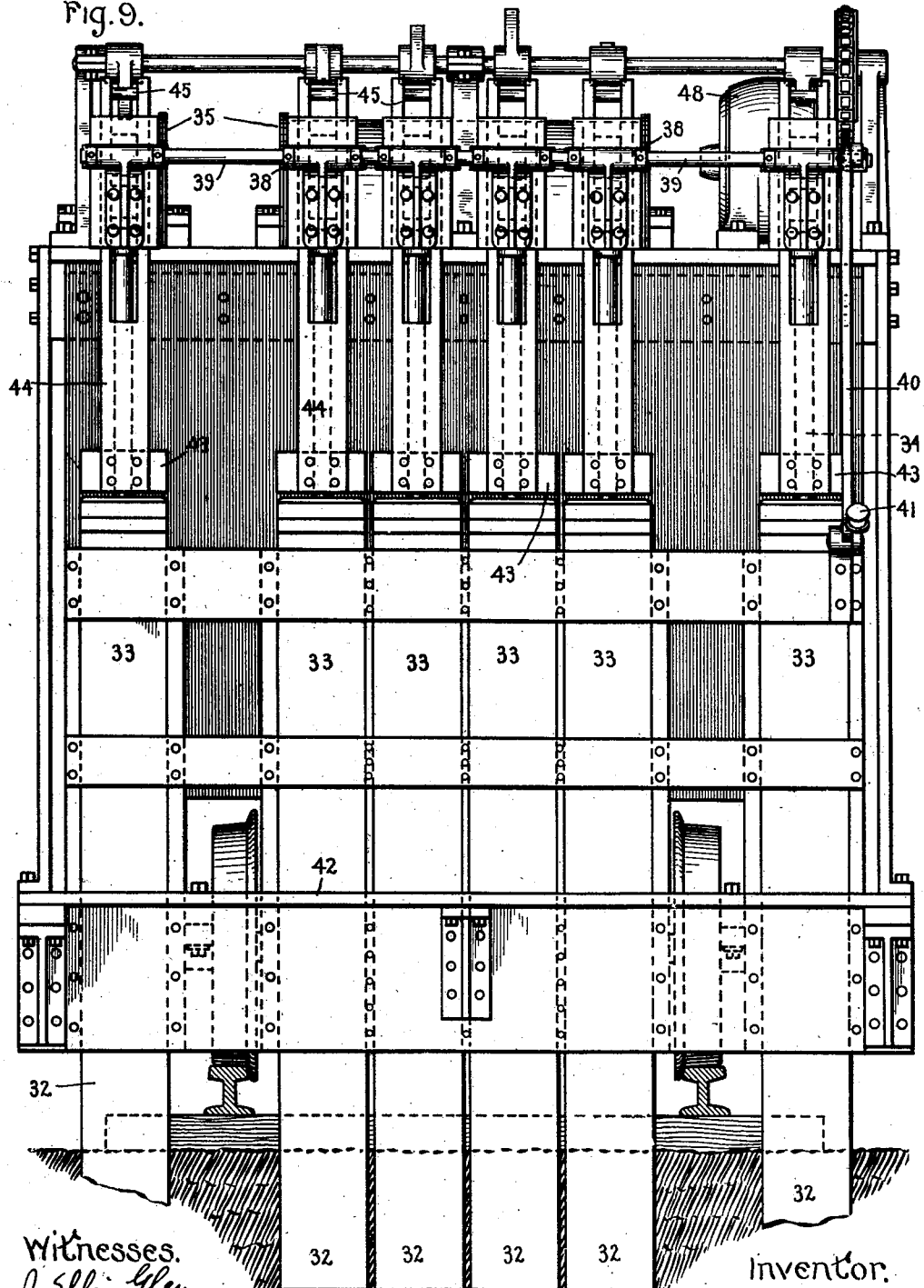

UNITED STATES PATENT OFFICE.

ROBERT NEIL WILLIAMS, JR., OF BALTIMORE, MARYLAND.

CLAY-EXCAVATOR.

No. 898,079.   Specification of Letters Patent.   Patented Sept. 8, 1908.

Application filed December 30, 1907. Serial No. 408,495.

*To all whom it may concern:*

Be it known that I, ROBERT NEIL WILLIAMS, Jr., citizen of the United States, residing at Baltimore, in the State of Maryland, have invented certain new and useful Improvements in Clay-Excavators, of which the following is a specification.

My present invention relates particularly to the mining of tough fire-brick clays, and comprises means whereby these clays can be taken from a bank or pit and loaded into cars, with a minimum of hand labor.

The tough clays on which my machine works to best advantage are to be found in Germany and in certain portions of New Jersey and are used largely for the manufacture of fire-bricks, pottery, porous building blocks and similar products. The clays ordinarily occur in approximately horizontal strata, varying somewhat in chemical composition and sometimes containing impurities such as iron ores or coal. In general, the material from the several strata must be kept separate, each being used for the particular purpose to which, by virtue of its special chemical composition, it is best adapted. The clays are soft and yielding but are so very tough and tenacious that great difficulty has heretofore been experienced in removing them from the bank. Dynamite cannot successfully be used. It serves merely to heave up the clay locally without actually destroying the integrity of the deposit. The clays are too tough and tenacious to be successfully plowed or shoveled, and in fact are so peculiar in their physical characteristics that power-driven excavating machinery of ordinary types have never been commonly used thereon.

My present invention comprises a power-driven cutter-tube which can be forced into a deposit of tough clay to cut out a column or slug, and which, when subsequently withdrawn, carries with it the slug, ultimately delivering the latter to a suitable belt conveyer by which it may be loaded into wagons or cars. To secure this result, the cutter-tube is open at the end opposite the cutting edge, and each successive slug or column serves to force its predecessor upward through the tube. The slugs are finally discharged from the upper end of the tube.

The details of my invention will be better understood by reference to the following description taken in connection with the accompanying drawings.

Figure 1:
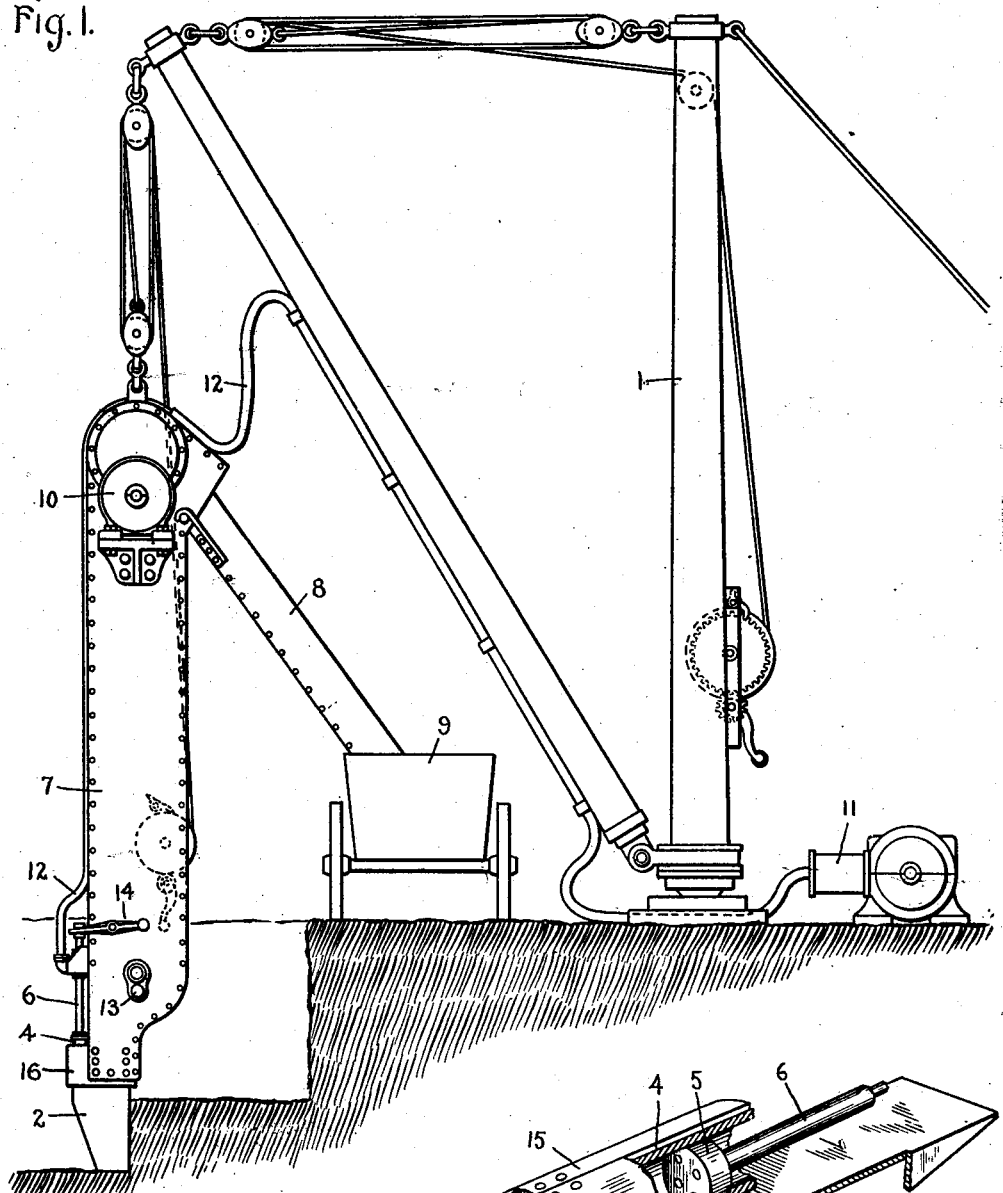
Figure 2:
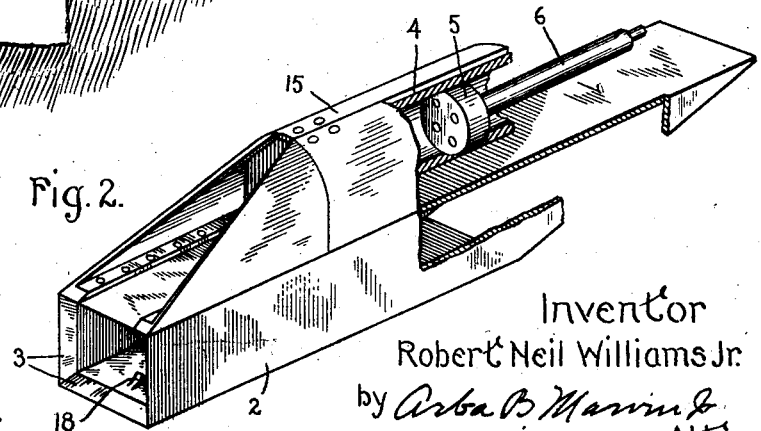

In the drawing, Figure 1 illustrates an embodiment of my invention, wherein a single cutter-tube is used; Fig. 2 is a perspective of a cutter-tube and driving cylinder, with certain portions broken away; Fig. 3 is a detail, partly in section, showing the relation of the tubular cutter, the driving piston and the belt conveyer; Figs. 4 and 5 are, respectively, an end elevation and a plan view of the same; Fig. 6 is a sectional elevation showing the valve used to control the driving cylinder; Fig. 7 illustrates a second embodiment provided with a plurality of cutter-tubes; Fig. 8 is a sectional elevation of the cutting mechanism thereof, and Fig. 9 is an end elevation showing all the cutter-tubes in operation.

In Fig. 1, the excavator is shown suspended from a crane 1 provided with suitable tackle by which the excavator can be lowered and otherwise adjusted in the clay pit. The excavator comprises a tubular cutter 2, preferably square in cross section, provided at its lower end with a cutting edge 3. Connected to the tubular cutter and movable therewith is a driving cylinder 4 having a stationary piston 5 and piston rod 6. The piston rod is hollow and serves to deliver compressed air to the cylinder, as hereinafter described. The tubular cutter and its driving cylinder are carried in the end of a long steel box or casing 7, with respect to which they move up and down as each slug of clay is cut from the bank or pit. This box or casing 7 serves to inclose a conveyer by which the excavated clay is raised to a suitable level for dumping through a chute 8 into a wagon 9. The conveyer may be driven by an electric motor 10 geared thereto. Compressed air for operating the driving cylinder 4 may be conveniently supplied by a motor driven air compressor 11 communicating with the driving cylinder through suitable tubing 12.

The box or casing 7 is provided with side handles 13 whereby it can be guided by the operator. Above these handles are hand-levers 14 for controlling the entrance of air to the driving cylinder, as well as its exit therefrom, thereby controlling the stroke of the tubular cutter 2. For a better understanding of the details of construction, reference may be had to Figs. 3, 4 and 5. The tubular cutter 2 is of uniform cross-section throughout but has a sheet metal extension 15 inclosing and protecting the driving cylinder 4. Inclosing the tubular cutter and its attached driving cylinder is a collar 16 serving as a guideway and bearing for the reciprocating elements. This collar is rigidly secured to the several plates of the box or casing 7. At each successive downward movement of the tubular cutter and cylinder, a slug 17 of clay is cut from the pit and serves to force upward, through the cutter, the slug which immediately preceded it. The natural tenacity and stickiness of fire-brick clay prevent the slugs from slipping out of the cutter when it is raised for another cut; but to assist this action, the tubular cutter may, if desired, be provided with numerous small projections or prongs 18 integral with the walls thereof and extending into the slug. When a slug has been raised sufficiently, it is engaged by the buckets 19 of the belt conveyer or elevator and is carried up for discharge through a suitable chute.

Fig. 6 illustrates the valve control of the driving cylinder. The cylinder 4 is provided with a suitably packed head through which passes the stationary piston rod 6. As previously stated, this rod is hollow and serves to convey compressed air or other expansive fluid from the supply pipe 12 to the cylinder. With the piston-head 5 in the position shown in Fig. 6, the air passes through ports 20 and lifts the cylinder along the piston-rod. The other end of the cylinder exhausts through the piston-head by way of ports 21 and a tube 22 inclosed in the hollow piston-rod. This second tube carries at its lower end a packed head having ports 23 for coöperation with either ports 20 or 21. When the upward movement is complete, the tube 22 is raised in suitable manner to shut off the air supply through ports 20 and to open up an exhaust passage by way of ports 23. With the valve in the raised position, air is supplied through ports 21 by way of the vertical channels 24 and then serves to force the cylinder downward for another cut in the clay. As a means for raising and lowering the inner tube 22 to secure proper "cut-off," I use the hand levers 14 which loosely engage a collar 25 secured to the upper end of tube 22. If desired, the cut-off may be made automatic by means of a vertical rod 26 (see Fig. 4) carried by the cylinder 4 and having adjustable lugs 27 and 28 which, at the proper time, strike against the lever 14 and automatically raise or lower the same.

The embodiment shown in Figs. 7, 8 and 9 differs in some respects from that just described. A plurality of tubular cutters are used, all mounted on the end of a car and adapted to cut down on either side of the rails on which the car is carried. The car itself may consist of but a simple steel framework rigidly built and suitably mounted on running gear. It carries a motor-driven air compressor 29, supplying air to an equalizing tank 30 which communicates with a distributing head 31 from which the several driving cylinders receive their supply. The tubular cutters 32, of which there are six arranged across the end of the car, each carries a driving cylinder 33 mounted thereon and movable up and down on a stationary piston-rod 34. Each tubular cutter discharges clay from its upper end upon a bucket conveyer 35, driven in a suitable manner, as by an electric motor 36. For the four central cutters, operative between the rails of the track, a single bucket conveyer may suffice, but for the end cutters, separate conveyers are preferable. Clay carried upward by the conveyers is discharged through a chute 37 into suitable cars or carts.

To secure proper regulation of the air supplied to the driving cylinders 33, I utilize concentric valves of the type previously described. I control all the valves simultaneously by means of U shaped levers 38 keyed to a rock-shaft 39. The levers 38 are similar to, and correspond with, the levers 14 of Fig. 5. The rock-shaft 39 is actuated through a link 40 connected with a hand lever 41 within easy reach of an operator standing on the end platform 42.

The flexibility of control afforded by the use of compressed air or similar expansive fluid is of first importance. The depth of cut can be regulated at will and the cuttings thereby be made to follow closely the natural strata of the clay, thus avoiding contamination of one stratum by different material from the next.

In case a tubular cutter is thrust into very hard clay or into clay carrying gravel or other resisting material, it may fail to complete an entire stroke, in which event, however, no unusual shock is imparted to any part of the equipment and no unusual stress is applied. The air pressure may be held on the piston until the cutter tube has gradually settled through the impeding material, or, if desired, recourse may be had to a special drop hammer arrangement mounted above the cylinders and operative to assist in driving the cutter tube downward.

A separate drop hammer arrangement is provided for each cutter tube and comprises a weight 43 movable up and down on the stationary piston rod 34 and adapted to deliver hammer blows on the top of the cylinder 33. As a means for raising the weight, I make use of a heavy metal plate 44 slotted throughout the greater part of its length and provided with transverse rollers 45 arranged like the rungs of a ladder. A cam 46 engages with one or another of these rungs and serves to lift the weight a short distance, letting it drop on the cylinder top. When the cylinder and cutter are at the upward limit of their path, the cam passes freely under the lowermost rung or roller, but as the cylinder and cutter are forced downward by the air, the cam engages with first one and then another of the several rungs.

A separate cam is provided for each of the six cylinders and cutters, all six cams being mounted on a shaft 47 driven in suitable manner, as by an electric motor 48. I prefer that the speed of the cams shall be such that the upward movement of each weight is about the same as that of its coöperating cylinder. This insures an upward movement free from hammer blows.

The six cutters shown in Fig. 9 correspond in every way with the tubular cutter of Figs. 2 and 3, and coöperate with one another in cutting a sort of trench at right angles to the car track. As the work proceeds and the car is moved progressively down the track, the cutters take out all clay not covered by the rails and ties thereby leaving the latter resting on a skeleton of clay a foot or two in thickness. As soon as a complete cut has been made, the clay skeleton under the rails and ties can be knocked out with a maul, whereupon the track settles to a new position and the excavator can be run back for another cut.

It is apparent that the apparatus described may be varied in many ways without departing from the spirit of my invention.

What I claim as new and desire to secure by Letters Patent of the United States, is:

1. In a clay excavator, a tubular cutter having a cutting edge at one end, a uniform bore throughout, and a discharge opening at the end opposite said cutting edge.

2. In a clay excavator, a tubular cutter of rectangular cross-section having a cutting edge at one end, a uniform bore throughout, projections within said cutter for holding clay therein, and a discharge opening for said clay at the end of said cutter opposite said cutting edge.

3. In a clay excavator, the combination of a tubular cutter, and fluid driven means connected therewith for forcing said cutter into a clay bank and for withdrawing it therefrom.

4. In a clay excavator, the combination of a tubular cutter, a driving cylinder rigidly connected therewith, a stationary piston for said cylinder, and means for supplying an expansive fluid to said cylinder to project said tubular cutter into a clay bank.

5. In a clay excavator, the combination of a tubular cutter having a cutting edge at one end and a discharge opening at the other end, means for driving said cutter into a clay deposit and for withdrawing it therefrom, and a conveyer adjacent to said cutter and operative to receive material discharged therethrough.

6. In a clay excavator, the combination of a tubular cutter having a cutting edge at one end and a discharge opening at the other end, a driving cylinder connected to said tubular cutter and operative to project it into a clay deposit and to withdraw it therefrom, and a conveyer having buckets which pass by said discharge opening.

7. In a clay excavator, the combination of a tubular cutter, and driving means connected therewith, said means comprising a cylinder rigidly connected to said cutter, a piston stationary with respect to said cutter, and passages through said piston for the entrance and exit of a driving fluid.

8. In a clay excavator, the combination of a tubular cutter, a cylinder rigidly connected with said cutter and movable therewith, a hollow piston for said cylinder, an inner tube passing through said hollow piston and carrying a valve, and means for moving said inner tube to control the movements of said tubular cutter.

9. In a clay excavator, the combination of a tubular cutter having a cutting edge at one end and a discharge opening at the opposite end, a driving cylinder rigidly connected to said cutter, a stationary piston in said cylinder, means within said piston for controlling the supply of expansive fluid to said cylinder, and a conveyer adjacent to the discharge end of said cutter for transporting clay discharged therefrom when the tubular cutter is driven into a clay deposit by said driving cylinder.

10. In a clay excavator, the combination of a car, a plurality of tubular cutters mounted across the end thereof, a driving cylinder for each cutter, means for controlling the supply of an expansive fluid to said cylinders to raise and lower said cutters and means for elevating the clay discharged from the upper ends of said tubular cutters.

11. In a clay excavator, the combination of a car, a plurality of tubular cutters mounted across the end thereof, a driving cylinder mounted above each cutter and movable therewith, a stationary piston for each cylinder having a passage for the entrance of a driving fluid, a common fluid supply for said cylinders, and means for controlling the passage of fluid from said source to said cylinders.

12. In a clay excavator, the combination of a tubular cutter, a driving cylinder connected therewith to force said cutter into the clay, and means for pounding on said cylinder to assist in driving said cutter.

13. In a clay excavator, the combination of a tubular cutter, fluid actuated means for moving said cutter into a clay deposit, and means for delivering a hammer blow to said cutter while moving into said clay.

14. In a clay excavator, the combination of a tubular cutter, a fluid driven cylinder for pushing said cutter into a clay deposit, and a hammer supported above said cylinder and operative to assist in driving said cutter.

15. In a clay excavator, the combination of a plurality of tubular cutters, a driving cylinder for each cutter, a drop hammer cooperating with each cylinder in driving its cutter, a series of cams for lifting said hammers, and a driving means common to all said cams.

16. In a clay excavator, the combination of a tubular cutter having a cutting edge at one end and a discharge opening at the opposite end, a driving cylinder mounted on said cutter, a stationary piston for said cylinder, a hammer sliding on said piston, and a cam for raising said hammer.

ROBERT NEIL WILLIAMS, Jr.

Witnesses:
    JOHN P. JUDGE,
    E. M. WALTHER.